United States Patent
Myoken (10) Patent No.: US 10,368,007 B2
(45) Date of Patent: Jul. 30, 2019

(54) CONTROL APPARATUS, HEAD-MOUNTED DISPLAY, CONTROL SYSTEM, CONTROL METHOD, AND PROGRAM

(71) Applicant: Sony Interactive Entertainment Inc., Tokyo (JP)

(72) Inventor: Takeshi Myoken, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/761,970

(22) PCT Filed: Oct. 5, 2016

(86) PCT No.: PCT/JP2016/079662
§ 371 (c)(1),
(2) Date: Mar. 21, 2018

(87) PCT Pub. No.: WO2017/061488
PCT Pub. Date: Apr. 13, 2017

(65) Prior Publication Data
US 2018/0278825 A1 Sep. 27, 2018

Related U.S. Application Data

(63) Continuation of application No. PCT/JP2016/079662, filed on Oct. 5, 2016.

(30) Foreign Application Priority Data

Oct. 8, 2015 (JP) .................................. 2015-200311

(51) Int. Cl.
*H04N 5/235* (2006.01)
*G02B 27/02* (2006.01)
(Continued)

(52) U.S. Cl.
CPC ....... *H04N 5/2354* (2013.01); *G02B 27/0093* (2013.01); *G02B 27/0172* (2013.01);
(Continued)

(58) Field of Classification Search
CPC ...... G02B 2027/0138; G02B 2027/014; G02B 27/0093; G02B 27/0172; G02B 27/02;
(Continued)

(56) References Cited

U.S. PATENT DOCUMENTS 9,971,404 B2 * 5/2018 Messingher ............ G06F 3/012
2014/0361956 A1 12/2014 Mikhailov
(Continued)

FOREIGN PATENT DOCUMENTS

EP 2486441 A1 8/2012
JP 2004205711 A 7/2004
(Continued)

OTHER PUBLICATIONS

International Preliminary Report for corresponding PCT Application No. PCT/JP2016/079662, 5 pages, dated Apr. 19, 2018.
(Continued)

*Primary Examiner* — Dmitriy Bolotin
(74) *Attorney, Agent, or Firm* — Matthew B. Dernier, Esq.

(57) ABSTRACT

In a head-mounted display including a light-emitting unit for specifying a posture, control of luminance of the light-emitting unit is enabled without separately providing a device for measuring the luminance of the light-emitting unit. A posture specifying unit specifies a posture of an HMD including a light-emitting unit that emits light at luminance according to drive current, the posture specified based on a posture specifying image taken by a camera, the posture specifying image including an image of the light-emitting unit. A luminance information specifying unit
(Continued)

specifies information indicating the luminance of the light-emitting unit based on a luminance specifying image taken by the camera that takes the posture specifying image, the luminance specifying image including an image of the light-emitting unit. A drive current control unit controls the drive current of the light-emitting unit based on the specified information indicating the luminance of the light-emitting unit.

8 Claims, 6 Drawing Sheets

(51) Int. Cl.
*G09G 5/00* (2006.01)
*H04N 5/64* (2006.01)
*G02B 27/00* (2006.01)
*G02B 27/01* (2006.01)
*H04N 5/225* (2006.01)

(52) U.S. Cl.
CPC .............. *G02B 27/02* (2013.01); *G09G 5/00* (2013.01); *H04N 5/2256* (2013.01); *H04N 5/64* (2013.01); *G02B 2027/014* (2013.01); *G02B 2027/0138* (2013.01)

(58) Field of Classification Search
CPC ...... G09G 5/00; H04N 5/2256; H04N 5/2354; H04N 5/64
See application file for complete search history.

(56) References Cited

U.S. PATENT DOCUMENTS

| | | | |
|---|---|---|---|
| 2015/0193949 A1 | 7/2015 | Katz | |
| 2015/0261291 A1* | 9/2015 | Mikhailov | G06F 3/012 345/156 |
| 2015/0348327 A1* | 12/2015 | Zalewski | G06F 3/01 345/419 |
| 2016/0260251 A1* | 9/2016 | Stafford | G06T 19/006 |
| 2016/0306431 A1* | 10/2016 | Stafford | G06F 3/014 |

FOREIGN PATENT DOCUMENTS

| | | |
|---|---|---|
| JP | 2012002889 A | 1/2012 |
| JP | 2012226666 A | 11/2012 |
| JP | 2013210588 A | 10/2013 |
| WO | 2012047221 A1 | 4/2012 |
| WO | 2014197338 A2 | 12/2014 |

OTHER PUBLICATIONS

International Search Report for corresponding PCT Application No. PCT/JP2016/079662, 2 pages, dated Dec. 27, 2016.
Extended European Search Report for corresponding EP Application No. 16853642.3, 8 pages, dated Mar. 26, 2019.

\* cited by examiner

CONTROL APPARATUS, HEAD-MOUNTED DISPLAY, CONTROL SYSTEM, CONTROL METHOD, AND PROGRAM

TECHNICAL FIELD

The present invention relates to a control apparatus, a head-mounted display, a control system, a control method, and a program.

BACKGROUND ART

There is known a head-mounted display (HMD) mounted on the head of a user to view a video as described, for example, in PTL 1 to 3. There is an HMD including a plurality of light-emitting units, such as light-emitting diodes (LEDs), that emit light at luminance according to drive current, and the posture of the HMD can be specified based on an image of the plurality of light-emitting units taken by a camera.

CITATION LIST

Patent Literature

[PTL 1] JP 2004-205711A, [PTL 2] JP 2012-2889A, [PTL 3] JP 2013-210588A

SUMMARY

Technical Problems

When the posture of the HMD is specified based on the image of the light-emitting units taken by the camera, the accuracy of specifying the posture of the HMD is reduced if the luminance of the light-emitting units is low. On the other hand, the power consumption of the light-emitting units increases with an increase in the luminance of the light-emitting units, and it is desirable that the luminance of the light-emitting units be as low as possible. Furthermore, the luminance of the light-emitting units needs to be increased to specify the posture of the HMD when, for example, the environment around the HMD is bright.

Here, the relationship between the drive current and the luminance of the light-emitting units depends on the characteristics of elements, the length of operating time, the temperature of the surroundings when the light-emitting units are used, and the like, and the luminance of the light-emitting units is not uniquely determined by the magnitude of the drive current.

Therefore, the drive current flowing in the light-emitting units needs to be controlled based on a measurement result of the luminance of the light-emitting units to maintain the luminance of the light-emitting units at some degree. However, in the past, a device for measuring the luminance needs to be separately provided to perform the control.

The present invention has been made in view of the circumstances, and an object of the present invention is to enable to control luminance of light emitting units for specifying the posture without separately providing a device for measuring the luminance of the light-emitting units in a head-mounted display including the light-emitting units.

Solution to Problems

To solve the above problems, the present invention provides a control apparatus including a posture specifying unit, a luminance information specifying unit, and a drive current control unit. The posture specifying unit specifies a posture of a head-mounted display including a light-emitting unit that emits light at luminance according to drive current, the posture specified based on a posture specifying image taken by a camera, the posture specifying image including an image of the light-emitting unit. The luminance information specifying unit specifies information indicating the luminance of the light-emitting unit based on a luminance specifying image taken by the camera that takes the posture specifying image, the luminance specifying image including an image of the light-emitting unit. The drive current control unit controls the drive current of the light-emitting unit based on the specified information indicating the luminance of the light-emitting unit.

In an aspect of the present invention, the luminance information specifying unit specifies the information indicating the luminance of the light-emitting unit based on an area occupied by the light-emitting unit in the luminance specifying image including the image of the light-emitting unit.

In an aspect of the present invention, the posture specifying image and the luminance specifying image are the same image.

In an aspect of the present invention, further included is a target value determination unit that determines a target value of the information indicating the luminance based on brightness of environment, in which the drive current control unit controls the drive current of the light-emitting unit according to the target value of the information indicating the luminance.

In an aspect of the present invention, when the information indicating the luminance of the light-emitting unit cannot be specified, the luminance information specifying unit notifies that the information cannot be specified.

In the aspect, the head-mounted display may include a plurality of light-emitting units, and when the information indicating the luminance of one of the plurality of light-emitting units cannot be specified, the luminance information specifying unit may issue a notification according to the light-emitting unit for which the information indicating the luminance cannot be specified.

The present invention provides a head-mounted display including a posture specifying unit, a luminance information specifying unit, and a drive current control unit. The posture specifying unit specifies a posture of the head-mounted display based on a posture specifying image taken by a camera, the posture specifying image including an image of a light-emitting unit. The luminance information specifying unit specifies information indicating the luminance of the light-emitting unit based on a luminance specifying image taken by the camera that takes the posture specifying image, the luminance specifying image including an image of the light-emitting unit. The drive current control unit controls the drive current of the light-emitting unit based on the specified information indicating the luminance of the light-emitting unit.

The present invention provides a control system including a posture specifying unit, a luminance information specifying unit, and a drive current control unit. The posture specifying unit specifies a posture of a head-mounted display including a light-emitting unit that emits light at luminance according to drive current, the posture specified based on a posture specifying image taken by a camera, the posture specifying image including an image of the light-emitting unit. The luminance information specifying unit specifies information indicating the luminance of the light-emitting unit based on a luminance specifying image taken by the camera that takes the posture specifying image, the luminance specifying image including an image of the light-emitting unit. The drive current control unit controls the drive current of the light-emitting unit based on the specified information indicating the luminance of the light-emitting unit.

The present invention provides a control method including a step of specifying a posture of a head-mounted display including a light-emitting unit that emits light at luminance according to drive current, the posture specified based on a posture specifying image taken by a camera, the posture specifying image including an image of the light-emitting unit, a step of specifying information indicating the luminance of the light-emitting unit based on a luminance specifying image taken by the camera that takes the posture specifying image, the luminance specifying image including an image of the light-emitting unit, and a step of controlling the drive current of the light-emitting unit based on the specified information indicating the luminance of the light-emitting unit.

The present invention provides a program causing a computer to execute a procedure of specifying a posture of a head-mounted display including a light-emitting unit that emits light at luminance according to drive current, the posture specified based on a posture specifying image taken by a camera, the posture specifying image including an image of the light-emitting unit, a procedure of specifying information indicating the luminance of the light-emitting unit based on a luminance specifying image taken by the camera that takes the posture specifying image, the luminance specifying image including an image of the light-emitting unit, and a procedure of controlling the drive current of the light-emitting unit based on the specified information indicating the luminance of the light-emitting unit.

DESCRIPTION OF EMBODIMENT

Hereinafter, an embodiment of the present invention will be described with reference to the drawings.

Figure 1:
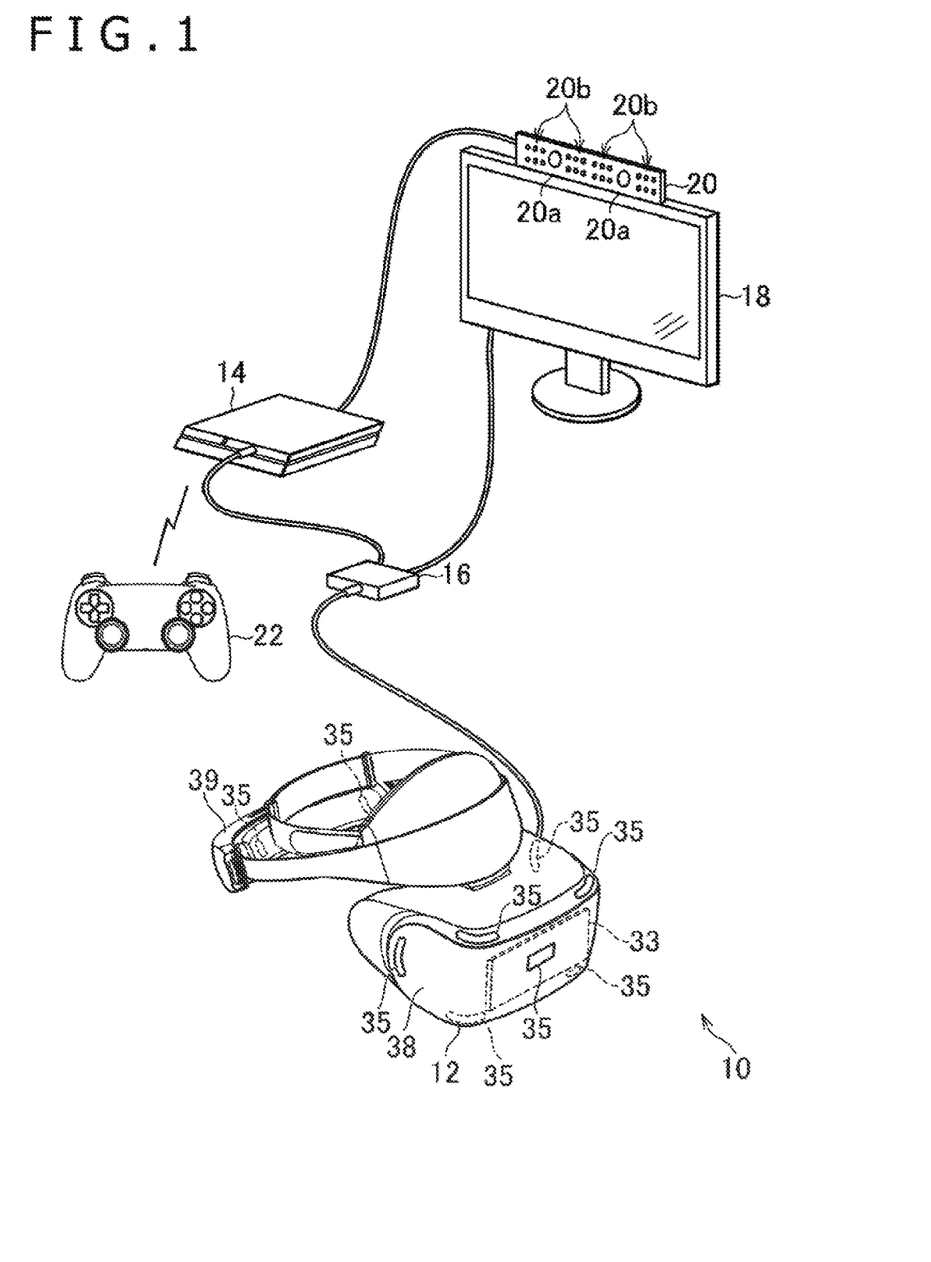
FIG. 1 is a diagram depicting an example of an overall configuration of a video display system according to an embodiment of the present invention.
Figure 2A:
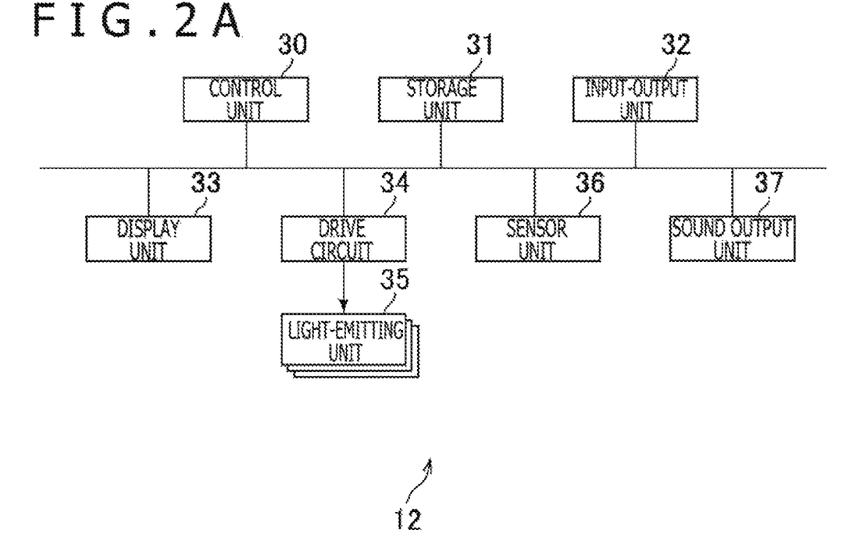
FIG. 2A is a diagram depicting an example of a configuration of a head-mounted display according to the embodiment of the present invention.
Figure 2B:
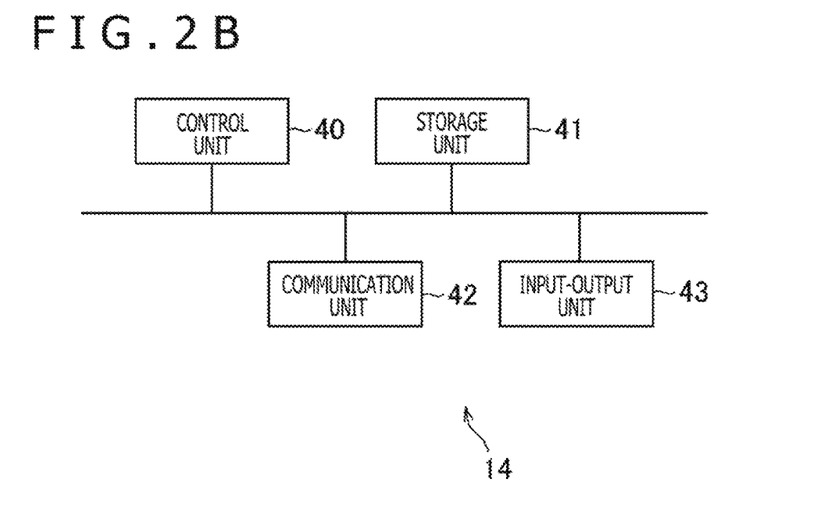
FIG. 2B is a diagram depicting an example of a configuration of an entertainment apparatus according to the embodiment of the present invention.

FIG. 1 is a diagram depicting an example of an overall configuration of a video display system 10 according to an embodiment of the present invention. FIG. 2A is a diagram depicting an example of a configuration of an HMD 12 according to the present embodiment. FIG. 2B is a diagram depicting an example of a configuration of an entertainment apparatus 14 according to the present embodiment.

As depicted in FIG. 1, the video display system 10 according to the present embodiment includes the HMD 12, the entertainment apparatus 14, a relay apparatus 16, a display 18, a camera microphone unit 20, and a controller 22.

The HMD 12 according to the present embodiment includes a control unit 30, a storage unit 31, an input-output unit 32, a display unit 33, a drive circuit 34, a plurality of light-emitting units 35, a sensor unit 36, and a sound output unit 37 as depicted, for example, in FIG. 2A.

The control unit 30 is, for example, a program control device, such as a microprocessor, that operates according to a program installed on the HMD 12.

The storage unit 31 is, for example, a storage element such as a read-only memory (ROM) and a random access memory (RAM). A program and the like executed by the control unit 30 are stored in the storage unit 31.

The input-output unit 32 is, for example, an input-output port, such as a high-definition multimedia interface (HDMI) (registered trademark) port, a universal serial bus (USB) port, and an auxiliary (AUX) port.

The display unit 33 is, for example, a display, such as a liquid crystal display and an organic electroluminescence (EL) display, arranged on the front side of the HMD 12, and the display unit 33 displays a video and the like generated by the entertainment apparatus 14. Further, the display unit 33 is housed in a housing 38 of the HMD 12. The display unit 33 may, for example, receive a video signal output by the entertainment apparatus 14 and relayed by the relay apparatus 16 to output a video indicated by the video signal. The display unit 33 according to the present embodiment can display, for example, an image for the left eye and an image for the right eye to display a three-dimensional image. Note that the display unit 33 may be able to display only a two-dimensional image and may be unable to display the three-dimensional image.

The drive circuit 34 is, for example, a circuit, such as an LED driver, for driving the plurality of light-emitting units 35.

The light-emitting unit 35 includes a light-emitting element, such as an LED, and emits light at luminance according to drive current output by the drive circuit 34. The HMD 12 according to the present embodiment includes a plurality of light-emitting units 35. One of the plurality of light-emitting units 35 is arranged at the center on the front surface of the housing 38. The light-emitting unit 35 is also arranged at each of four corners on the front surface so as to extend over the front surface and the side surface of the housing 38. Each of the four light-emitting units 35 is arranged diagonally to the front surface of the housing 38 so as to face the outside of the outer edge of the front surface of the housing 38. The light-emitting unit 35 is also arranged on each of the left and right side surfaces of the housing 38. Two light-emitting units 35 are further arranged on a mounting band 39 that supports the housing 38. In this way, the HMD 12 according to the present embodiment includes nine light-emitting units 35. The light-emitting units 35 according to the present embodiment emit blue light.

The sensor unit 36 is, for example, a sensor, such as an acceleration sensor and a motion sensor. The sensor unit 36 outputs measurement results, such as an amount of rotation and an amount of movement, of the HMD 12 to the control unit 30 at a predetermined frame rate.

The sound output unit 37 is, for example, a headphone, a speaker, or the like, and the sound output unit 37 outputs sound or the like indicated by sound data generated by the entertainment apparatus 14. The sound output unit 37 receives, for example, a sound signal output by the entertainment apparatus 14 and relayed by the relay apparatus 16 and outputs the sound indicated by the sound signal.

The entertainment apparatus 14 according to the present embodiment is, for example, a computer, such as a game console, a digital versatile disc (DVD) player, and a Blu-ray (registered trademark) player. The entertainment apparatus 14 according to the present embodiment generates video or sound by, for example, executing a stored game program or by reproducing content recorded in an optical disk. The entertainment apparatus 14 according to the present embodiment outputs a video signal indicating the generated video or a sound signal indicating the generated sound to the HMD 12 or the display 18 through the relay apparatus 16.

The entertainment apparatus 14 according to the present embodiment includes a control unit 40, a storage unit 41, a communication unit 42, and an input-output unit 43 as depicted, for example, in FIG. 2B.

The control unit 40 is, for example, a program control device, such as a central processing unit (CPU), that operates according to a program installed on the entertainment apparatus 14. The control unit 40 according to the present embodiment includes a graphics processing unit (GPU) that draws an image in a frame buffer based on a graphics command or data supplied from the CPU.

The storage unit 41 is, for example, a storage element, such as a ROM and a RAM, or a hard disk drive. A program and the like executed by the control unit 40 are stored in the storage unit 41. An area of the frame buffer for the GPU to draw an image is also reserved in the storage unit 41 according to the present embodiment.

The communication unit 42 is, for example, a communication interface, such as an Ethernet (registered trademark) module and a wireless local area network (LAN) module.

The input-output unit 43 is an input-output port, such as an HDMI (registered trademark) port and a USB port.

The relay apparatus 16 according to the present embodiment is a computer that relays the video signal or the sound signal output from the entertainment apparatus 14 to output the video signal or the sound signal to the HMD 12 or the display 18.

The display 18 according to the present embodiment is, for example, a liquid crystal display, and the display 18 displays a video or the like indicated by the video signal output from the entertainment apparatus 14.

The camera microphone unit 20 according to the present embodiment includes, for example, a camera 20a that outputs a photographed image of an object to the entertainment apparatus 14, and a microphone 20b that acquires sound of the surroundings to convert the sound into sound data and output the sound data to the entertainment apparatus 14. The camera 20a according to the present embodiment is a stereo camera.

The HMD 12 and the relay apparatus 16 are connected through, for example, an HDMI cable or a USB cable. The entertainment apparatus 14 and the relay apparatus 16 are connected through, for example, an HDMI cable or a USB cable. The replay apparatus 16 and the display 18 are connected through, for example, an HDMI cable. The entertainment apparatus 14 and the camera microphone unit 20 are connected through, for example, an AUX cable.

The controller 22 according to the present embodiment is an operation input apparatus for inputting operations for the entertainment apparatus 14. A user can press arrow keys or buttons included in the controller 22 or tilt an operation stick to input various types of operations by using the controller 22. In the present embodiment, the controller 22 outputs input data associated with the input of operation to the entertainment apparatus 14. The controller 22 according to the present embodiment also includes a USB port. The controller 22 can connect to the entertainment apparatus 14 through a USB cable to output the input data to the entertainment apparatus 14 through a wire. The controller 22 according to the present embodiment further includes a wireless communication module or the like, and the controller 22 can also wirelessly output the input data to the entertainment apparatus 14.

Figure 3:
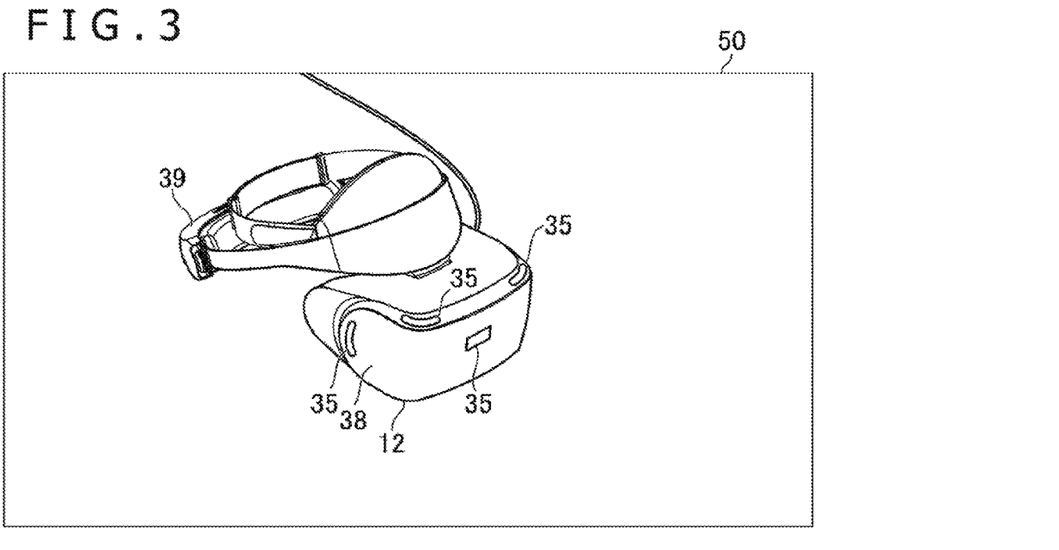
FIG. 3 is a diagram depicting an example of a captured image.

In the present embodiment, the camera 20a takes images at a predetermined frame rate. FIG. 3 is a diagram depicting an example of a captured image 50 that is an image taken by the camera 20a. The captured image 50 depicted in FIG. 3 includes images of the light-emitting units 35 arranged on the right side surface of the housing 38, the center of the front surface, the upper left corner of the front surface as viewed from the front, and the upper right corner of the front surface as viewed from the front. In the present embodiment, the posture of the HMD 12, such as the position and the direction of the HMD 12, is specified based on the positions of the images of the light-emitting units 35 in the captured image 50 illustrated in FIG. 3. Note that the posture of the HMD 12 may be specified based on the positions of the images of the light-emitting units 35 in the captured image 50 and the detection results of the amount of movement or the amount of rotation detected by the sensor unit 36. In this way, the video displayed on the display unit 33 and the objects displayed on the display unit 33 are controlled according to the specified posture of the HMD 12. Since the light-emitting units 35 are arranged at various positions in the present embodiment as described above, it is likely that the captured image 50 includes an image of one of the light-emitting units 35 regardless of which direction the user faces.

If the luminance of the light-emitting units 35 is too low, the accuracy of specifying the positions of the images of the light-emitting units 35 in the captured image 50 becomes low. On the other hand, it is better that the luminance of the light-emitting units 35 be low in order to reduce the power consumption. For this reason, it is desirable that the luminance of the light-emitting units 35 included in the HMD 12 according to the present embodiment fall in a predetermined range. In the video display system 10 according to the present embodiment, the luminance of the light-emitting units 35, the images of which are included in the captured image 50, is also specified based on the captured image 50 for specifying the posture of the HMD 12. The drive current for driving the light-emitting units 35 is controlled so that the luminance of the light-emitting units 35 falls in the predetermined range. In this way, the luminance of the light-emitting units 35 falls in the predetermined range in the video display system 10 according to the present embodiment.

Figure 4:
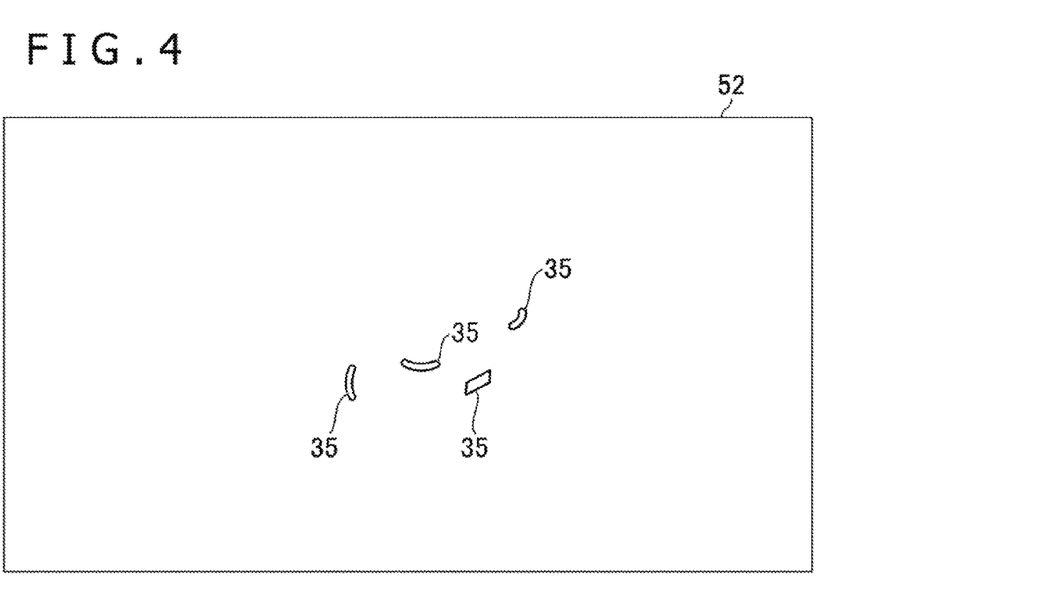
FIG. 4 is a diagram depicting an example of a light-emitting unit extraction image.

Note that areas occupied by the light-emitting units 35 in the captured image 50 may be extracted to generate a light-emitting unit extraction image 52 illustrated in FIG. 4. For example, image processing of extracting pixels satisfying a predetermined condition, such as pixels with blue pixel values in a predetermined range, may be applied to the captured image 50 to generate the light-emitting unit extraction image 52 illustrated in FIG. 4. Based on the areas occupied by the light-emitting units 35 in the light-emitting unit extraction image 52 generated in this way, the posture of the HMD 12 may be specified, and the luminance of the light-emitting units 35, the images of which are included in the light-emitting unit extraction image 52, may be specified.

The captured image 50 depicted in FIG. 3 and the light-emitting unit extraction image 52 depicted in FIG. 4 include a plurality of images of the light-emitting units 35. In the present embodiment, a well-known pattern recognition technology can be used to specify the position of each light-emitting unit 35 indicated by the image of the light-emitting unit 35.

The HMD 12 according to the present embodiment can also individually turn on or turn off the plurality of light-emitting units 35. Therefore, the position of a specific light-emitting unit 35 can be specified by causing only the specific light-emitting unit 35 to emit light. The position of each light-emitting unit 35 indicated by the image of the light-emitting unit 35 may also be specified in this way.

Figure 5:
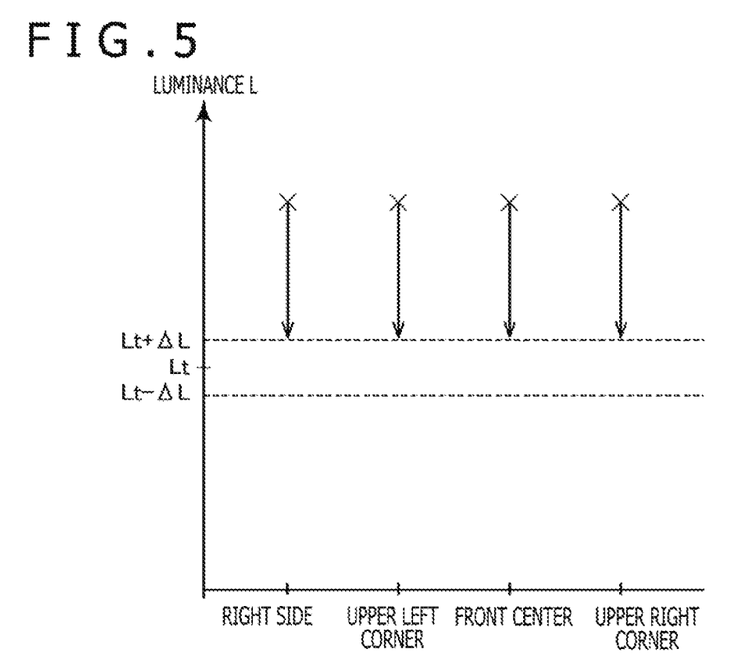
FIG. 5 is an explanatory view describing an example of adjustment of luminance of light-emitting units according to the embodiment of the present invention.
Figure 6:
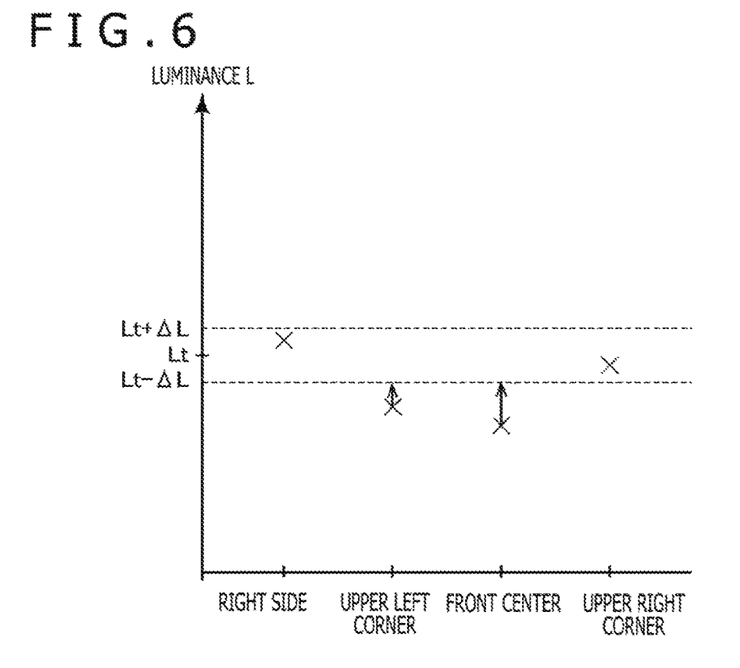
FIG. 6 is an explanatory view describing another example of the adjustment of the luminance of the light-emitting units according to the embodiment of the present invention.

Each of FIGS. 5 and 6 is an explanatory view describing an example of adjustment of the luminance of the light-emitting units 35 according to the embodiment of the present invention. FIGS. 5 and 6 depict target luminance Lt that is a target of luminance. The target luminance Lt may be predetermined luminance or may be luminance determined based on the brightness of the surroundings of the HMD 12 or the distance from the camera 20*a*. In FIGS. 5 and 6, × marks indicate luminance L of four light-emitting units 35, the images of which are included in the captured image 50 depicted in FIG. 3.

In the present embodiment, the luminance L of the light-emitting units 35 at the shipment of the HMD 12 is set to a relatively high luminance as depicted in FIG. 5. In this case, the drive current of the four light-emitting units 35 is reduced to control the luminance of the light-emitting units 35 so that the luminance falls in a predetermined range around the target luminance Lt. In the present embodiment, assuming that a threshold of the difference between the target luminance Lt and the luminance L is ΔL, the luminance of the light-emitting units 35 is controlled so that the luminance is Lt+ΔL or smaller than Lt+ΔL, for example. In this way, the power consumption of the light-emitting units 35 can be reduced according to the present embodiment.

Even when the light-emitting units 35 are driven by a constant drive current, the luminance decreases with an increase in the operating time. The speed of the decrease in the luminance of the light-emitting units 35 also varies depending on the temperature around the light-emitting units 35. In the example of FIG. 6, the luminance of the light-emitting unit 35 at the center on the front surface and the light-emitting unit 35 at the upper left corner on the front surface is lower than Lt−ΔL. In this case, the drive current of the two light-emitting units 35 is increased to control the luminance of the light-emitting units 35 so that the luminance falls in the predetermined range around the target luminance Lt. In the present embodiment, assuming that the threshold of the difference between the target luminance Lt and the luminance L is ΔL, the luminance of the light-emitting units 35 is controlled so that the luminance is Lt−ΔL or greater than Lt−ΔL, for example. In this way, according to the present embodiment, the luminance of the light-emitting units 35 can be controlled so that the luminance is, for example, greater than the minimum luminance that allows specifying the posture of the HMD 12 based on the captured image 50.

As described, the captured image 50 for specifying the posture of the HMD 12 is also used to specify the luminance of the light-emitting units 35 in the present embodiment, and the luminance of the light-emitting units 35 can be controlled without separately providing a device for measuring the luminance of the light-emitting units 35.

Although the posture specifying image for specifying the posture of the HMD 12 and the luminance specifying image for specifying the luminance of the light-emitting units 35 are the same image in the description above, the posture specifying image and the luminance specifying image may be different images. For example, the camera 20*a* may alternately take the posture specifying images and the luminance specifying images.

Hereinafter, the functions of the entertainment apparatus 14 according to the present embodiment and the processes executed by the entertainment apparatus 14 according to the present embodiment will be further described with a focus on the control of the luminance of the light-emitting units 35.

Figure 7:
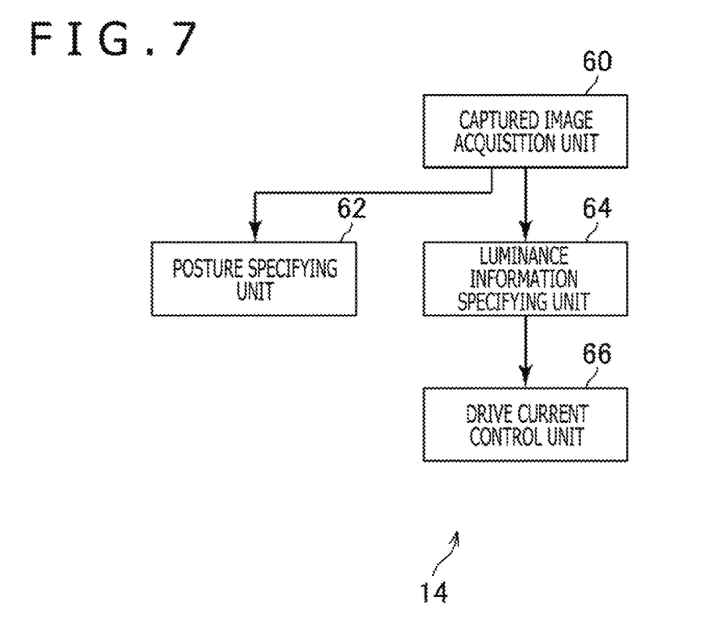
FIG. 7 is a functional block diagram depicting an example of functions provided in the head-mounted display according to the embodiment of the present invention.

FIG. 7 is a functional block diagram depicting an example of the functions provided in the entertainment apparatus 14 according to the present embodiment. Note that the entertainment apparatus 14 according to the present embodiment may not be provided with all of the functions depicted in FIG. 7 and may also be provided with functions other than the functions depicted in FIG. 7.

As depicted in FIG. 7, the entertainment apparatus 14 according to the present embodiment functionally includes, for example, a captured image acquisition unit 60, a posture specifying unit 62, a luminance information specifying unit 64, and a drive current control unit 66. The captured image acquisition unit 60, the posture specifying unit 62, and the drive current control unit 66 are mainly constituted by the control unit 40 and the input-output unit 43. The luminance information specifying unit 64 is mainly constituted by the control unit 40. The entertainment apparatus 14 according to the present embodiment plays a role as a control apparatus that controls the luminance of the light-emitting units 35.

The functions are provided by the control unit 40 executing programs installed on the entertainment apparatus 14 that is a computer, the programs including commands corresponding to the functions. The programs are supplied to the entertainment apparatus 14 through, for example, a computer-readable information storage medium, such as an optical disk, a magnetic disk, a magnetic tape, a magneto-optical disk, and a flash memory, or through the Internet or the like.

The captured image acquisition unit 60 acquires the captured image 50 taken by the camera 20*a* in the present embodiment.

The posture specifying unit 62 specifies the posture of the HMD 12 based on the captured image 50 taken by the camera 20*a*. The posture specifying unit 62 may receive, from the HMD 12, the data indicating the detection results of the amount of movement or the amount of rotation detected by the sensor unit 36 and specify the posture of the HMD 12 based on the received data and the captured image 50.

The luminance information specifying unit 64 specifies the information indicating the luminance of the light-emitting units 35 based on the captured image 50 including the images of the light-emitting units 35 taken by the camera 20*a*. In the present embodiment, the luminance information specifying unit 64 specifies, for example, the luminance of the light-emitting units 35, the images of which are included in the captured image 50 acquired by the captured image acquisition unit 60. When the camera 20a according to the present embodiment has a function of specifying the luminance of pixels in the captured image 50, the luminance information specifying unit 64 may acquire, from the camera 20a, the information indicating the luminance specified by the camera 20a. The luminance information specifying unit 64 may specify the luminance of the light-emitting units 35 based on the information indicating the luminance acquired from the camera 20a.

The luminance information specifying unit 64 may also specify the luminance of the light-emitting units 35 based on the areas occupied by the light-emitting units 35 in the captured image 50. For example, the luminance information specifying unit 64 may specify the luminance of the light-emitting units 35 based on the pixels in the areas extracted as areas occupied by the light-emitting units 35 in the light-emitting unit extraction image 52.

Note that a plurality of reference images associated with the luminance may be stored in the entertainment apparatus 14. In this case, the luminance information specifying unit 64 may specify the luminance of the light-emitting units 35 based on comparison results of each of the plurality of reference images and the captured image 50 acquired by the captured image acquisition unit 60. Specifically, for example, a reference image most similar to the captured image 50 may be specified, and the luminance associated with the reference image may be specified as the luminance of the light-emitting units 35.

The drive current control unit 66 controls the drive current of the light-emitting units 35 based on the specified luminance of the light-emitting units 35. In the present embodiment, for example, the drive current control unit 66 increases the drive current of the light-emitting units 35 if the luminance L of the light-emitting units 35 specified by the luminance information specifying unit 64 is smaller than $Lt-\Delta L$. On the other hand, the drive current control unit 66 reduces the drive current of the light-emitting units 35 if the luminance L of the light-emitting units 35 specified by the luminance information specifying unit 64 is greater than $Lt+\Delta L$. The drive current control unit 66 transmits, for example, data indicating the value of the drive current to the HMD 12 in the present embodiment. The control unit 30 of the HMD 12 then controls the drive circuit 34 to set the value of the drive current indicated by the data received from the entertainment apparatus 14. Note that the drive current control unit 66 may transmit data indicating an amount of increase or an amount of decrease of the drive current to the HMD 12. The control unit 30 of the HMD 12 may control the drive circuit 34 to set the value of the drive current according to the amount of increase or the amount of decrease indicated by the data received from the entertainment apparatus 14.

Here, an example of a flow of a luminance control process of the light-emitting unit 35 arranged at the center on the front surface of the housing 38 executed by the entertainment apparatus 14 according to the present embodiment will be described with reference to a flow diagram illustrated in FIG. 8.

Figure 8:
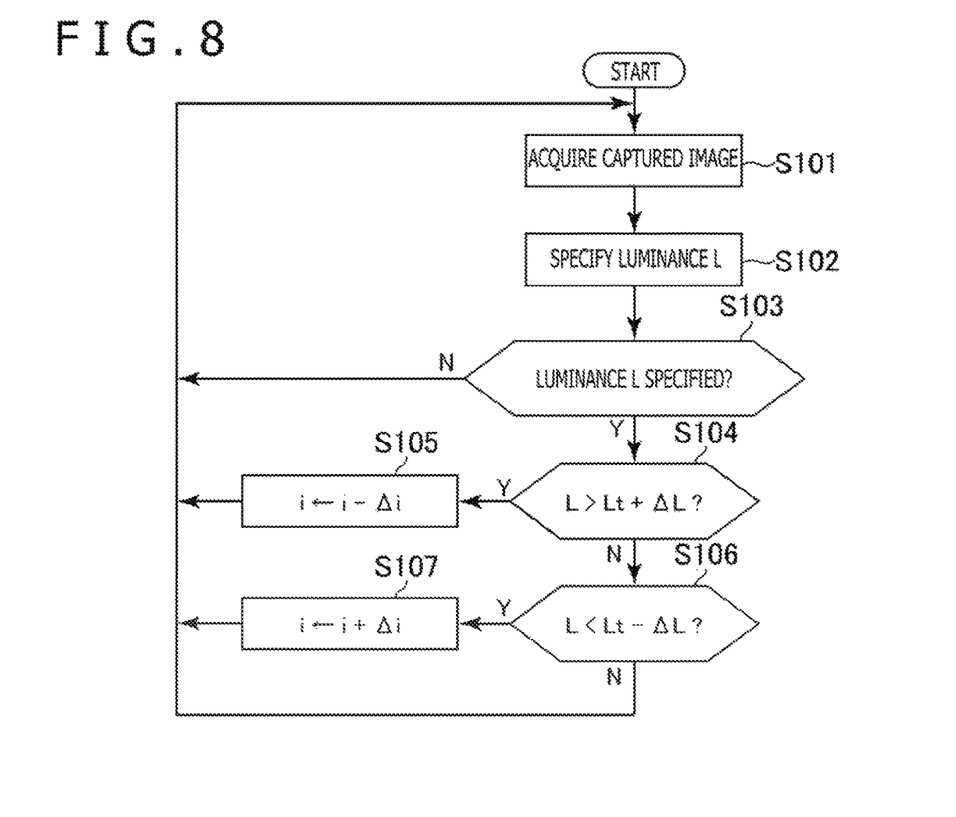
FIG. 8 is a flow diagram depicting an example of a flow of a process executed by the head-mounted display according to the embodiment of the present invention.

In the present embodiment, the luminance control process illustrated in FIG. 8 is repeatedly executed. Here, the luminance control process may be repeatedly executed at, for example, imaging intervals of the captured image 50 for specifying the luminance. For example, when the camera 20a captures the captured images 50 at 1/60 second intervals, and all of the captured images 50 are used as luminance specifying images, the luminance control process depicted in FIG. 8 may be executed at 1/60 second intervals. When, for example, the camera 20a captures the captured images 50 at 1/60 second intervals and alternately takes the captured images 50 for specifying the posture and the captured images 50 for specifying the luminance, the luminance control process depicted in FIG. 8 may be executed at 1/30 second intervals.

First, the captured image acquisition unit 60 acquires the captured image 50 (S101). The luminance information specifying unit 64 then specifies the luminance L of the light-emitting unit 35 arranged at the center on the front surface of the housing 38 based on the captured image 50 acquired in the process depicted in S101 (S102). In the process depicted in S102, the luminance information specifying unit 64 may specify the luminance L of the light-emitting unit 35 based on the pixels in the area occupied by the light-emitting unit 35 in the captured image 50 acquired in the process depicted in S101 as described above. For example, the luminance information specifying unit 64 may generate the light-emitting unit extraction image 52 based on the captured image 50 acquired in the process depicted in S101 and specify the luminance L of the light-emitting unit 35 based on the pixels in the area occupied by the light-emitting unit 35 in the light-emitting unit extraction image 52.

The drive current control unit 66 then checks whether or not the luminance L can be specified in the process depicted in S102 (S103). In the process depicted in S102, the luminance L of the light-emitting unit 35 cannot be specified in some cases, such as when the captured image 50 does not include the image of the light-emitting unit 35 arranged at the center on the front surface of the housing 38. If the luminance L cannot be specified in the process depicted in S102 (S103: N), the process returns to S101. In this case, the luminance L of the light-emitting unit 35 arranged at the center on the front surface of the housing 38 is not changed in the frame.

If the luminance L can be specified in the process depicted in S102 (S103: Y), the drive current control unit 66 checks whether or not the luminance L specified in the process depicted in S102 is greater than $Lt+\Delta L$ (S104). If the luminance L specified in the process depicted in S102 is greater than $Lt+\Delta L$ (S104: Y), the drive current control unit 66 reduces a drive current i of the light-emitting unit 35 arranged at the center on the front surface of the housing 38 by $\Delta i$ (S105), and the process returns to S101. In the present embodiment, $\Delta i$ is, for example, 1 mA.

If the luminance L specified in the process depicted in S102 is not greater than $Lt+\Delta L$ (S104: N), the drive current control unit 66 checks whether or not the luminance L specified in the process depicted in S102 is smaller than $Lt-\Delta L$ (S106). If the luminance L specified in the process depicted in S102 is smaller than $Lt-\Delta L$ (S106: Y), the drive current control unit 66 increases the drive current i of the light-emitting unit 35 arranged at the center on the front surface of the housing 38 by $\Delta i$ (S107), and the process returns to S101.

If the luminance L specified in the process depicted in S102 is not smaller than $Lt-\Delta L$ (S106: N), that is, if the luminance L specified in the process depicted in S102 is $Lt-\Delta L$ or more and $Lt+\Delta L$ or less, the process returns to S101. In this case, the luminance L of the light-emitting unit 35 arranged at the center on the front surface of the housing 38 is not changed in the frame.

Note that Δi described above may be a value smaller than 1 mA, such as 0.1 mA. While a smaller value of Δi allows more detailed control of the luminance of the light-emitting unit 35, the luminance that can be changed at the execution intervals of the process depicted in FIG. 8 becomes small.

Although the example of the flow of the luminance control process for the light-emitting unit 35 arranged at the center on the front surface of the housing 38 is illustrated in FIG. 8, the luminance control process is independently executed for each of the plurality of light-emitting units 35 included in the HMD 12. The luminance control process depicted in FIG. 8 may be executed in parallel or may be sequentially executed for each of the plurality of light-emitting units 35.

In this way, according to the present embodiment, the luminance of the light-emitting unit 35 is controlled such that the luminance approaches the predetermined range around the target luminance Lt every time the luminance control process depicted in FIG. 8 is executed.

Note that the luminance information specifying unit 64 may specify, for example, the brightness of the environment, such as the brightness of the space around the HMD 12, based on the captured image 50 acquired in the process depicted in S101. The luminance information specifying unit 64 may then determine a target value of the information indicating the luminance of the light-emitting unit 35, such as the target luminance Lt, based on the specified brightness of the environment. Here, for example, the higher the specified brightness of the environment is, the higher the determined target luminance Lt may be. Note that when the HMD 12 includes a brightness sensor, the brightness of the environment may be specified based on a measurement result of the brightness sensor. The drive current control unit 66 may then control the drive current of the light-emitting unit 35 according to the target value of the information indicating the luminance of the light-emitting unit 35 determined by the luminance information specifying unit 64. In this way, the luminance of the light-emitting unit 35 can be controlled to set the luminance according to the brightness of the environment. Specifically, for example, the luminance of the light-emitting unit 35 can be controlled to be higher for higher brightness of the environment.

The camera 20a of the present embodiment is a stereo camera, and the distance from the camera 20a to the light-emitting unit 35 can be measured. Therefore, the luminance information specifying unit 64 may determine the target luminance Lt based on, for example, the distance from the camera 20a to the light-emitting unit 35. In this case, for example, the longer the distance from the camera 20a to the light-emitting unit 35 is, the higher the determined target luminance Lt may be. In this way, the luminance of the light-emitting unit 35 can be controlled to set the luminance according to the distance from the camera 20a. Specifically, for example, the luminance of the light-emitting unit 35 can be controlled to be higher for a longer distance from the camera 20a.

In this way, the luminance information specifying unit 64 may also play a role as a target value determination unit that determines the target luminance Lt based on the brightness of the environment or the distance from the camera 20a. Note that the luminance information specifying unit 64 may determine the target luminance Lt based on a combination of the brightness of the environment and the distance from the camera 20a. The target luminance Lt determined in this way may be used in the process depicted in S104 or the process depicted in S106.

Furthermore, the drive current control unit 66 may not increase the drive current i in the process depicted in S107, if, for example, the drive current i exceeds a predetermined maximum current (for example, 30 mA) when the drive current i is increased by Δi. In this case, the drive current control unit 66 may output a message. For example, the drive current control unit 66 may transmit an instruction for displaying and outputting the message on the display unit 33 to the HMD 12, and the HMD 12 may display and output the message on the display unit 33. Alternatively, the drive current control unit 66 may transmit an instruction for outputting a predetermined sound to the HMD 12, and the HMD 12 may control the sound output unit 37 to output the predetermined sound. In this way, the user can recognize that the luminance does not fall in the predetermined range due to, for example, the end of the lifespan even if the predetermined maximum current is supplied to the light-emitting unit 35.

The luminance information specifying unit 64 may specify the light-emitting unit 35 with the lowest luminance. The drive current control unit 66 may control the drive current of the other light-emitting units 35 such that the luminance approaches the lowest luminance. In this way, the luminance of the other light-emitting units 35 is controlled such that the luminance approaches the luminance of the light-emitting unit 35 with the lowest luminance.

The luminance control process depicted in FIG. 8 may be executed, for example, during a play of a game, that is, in a period in which the entertainment apparatus 14 executes a game program and displays generated moving images on the display unit 33, or may be executed before the start of the play of the game.

When the luminance of the light-emitting unit 35 cannot be specified in the process depicted in S102, the luminance information specifying unit 64 may notify that the luminance cannot be specified. When the luminance of one of the plurality of light-emitting units 35 cannot be specified, the luminance information specifying unit 64 may issue a notification according to the light-emitting unit 35 for which the luminance cannot be specified. For example, when there is a light-emitting unit 35 for which the luminance L cannot be specified in the luminance control process executed before the start of the play of the game, the luminance information specifying unit 64 may output a notification to prompt the user to rotate the head so that the light-emitting unit 35 can be imaged by the camera 20a. For example, when the captured image 50 does not include the image of the light-emitting unit 35 arranged on the upper right corner on the front surface as viewed from the front, the luminance information specifying unit 64 may transmit an instruction for displaying and outputting a message "Face to the right." to the HMD 12. The HMD 12 that has received the instruction may cause the display unit 33 to display and output the message. Alternatively, the luminance information specifying unit 64 may transmit an instruction for outputting the sound of the message "Face to the right." to the HMD 12 in this case. The HMD 12 that has received the instruction may control the sound output unit 37 to output the sound of the message.

Although the light-emitting units 35 emit visible light (for example, blue light) in the description above, the light-emitting units 35 may emit light other than the visible light, such as infrared light. The camera 20a may be a camera that can image infrared rays.

When, for example, there is a light-emitting unit 35 for which the luminance cannot be specified by the luminance information specifying unit 64, the drive current control unit 66 may turn off the light-emitting unit 35.

The luminance information specifying unit 64 may specify information indicating the luminance, such as information of colors, pixel values, and areas of the light-emitting units 35, in place of the luminance of the light-emitting units 35. The drive current control unit 66 may control the drive current of the light-emitting units 35 based on the specified information of colors, pixel values, and areas of the light-emitting units 35.

Note that the present invention is not limited to the embodiment described above.

For example, the roles of the HMD 12, the entertainment apparatus 14, and the relay apparatus 16 are not limited to the roles described above. For example, part or all of the functions illustrated in FIG. 7 may be implemented by the HMD 12 or the relay apparatus 16. Alternatively, the functions illustrated in FIG. 7 may be distributed and implemented by the HMD 12, the entertainment apparatus 14, or the relay apparatus 16 constituting the video display system 10.

For example, the functions illustrated in FIG. 7 may be implemented by the control unit 30 executing programs installed on the HMD 12 that is a computer, the programs including commands corresponding to the functions. The programs may be supplied to the HMD 12 through, for example, a computer-readable information storage medium, such as an optical disk, a magnetic disk, a magnetic tape, a magneto-optical disk, and a flash memory, or through the Internet or the like.

Furthermore, part of the functions illustrated in FIG. 7 may be implemented by the control unit 30 executing programs installed on the HMD 12 that is a computer, the programs including commands corresponding to the part of the functions. The programs may be supplied to the HMD 12 through, for example, a computer-readable information storage medium, such as an optical disk, a magnetic disk, a magnetic tape, a magneto-optical disk, and a flash memory, or through the Internet or the like. Furthermore, the control unit 40 may execute programs including commands corresponding to the rest of the functions illustrated in FIG. 7 to implement the rest of the functions in the entertainment apparatus 14 that is a computer. The programs may be supplied to the entertainment apparatus 14 through, for example, a computer-readable information storage medium, such as an optical disk, a magnetic disk, a magnetic tape, a magneto-optical disk, and a flash memory, or through the Internet or the like.

Furthermore, the specific character strings or numerical values described above and the specific character strings or numerical values in the drawings are exemplary, and the character strings and the numerical values are not limited to these.

The invention claimed is:

1. A control apparatus comprising:
    a posture specifying unit that specifies a posture of a head-mounted display including a light-emitting unit that emits light at luminance according to drive current, the posture specified based on a posture specifying image taken by a camera, the posture specifying image including an image of the light-emitting unit;
    a luminance information specifying unit that specifies information indicating the luminance of the light-emitting unit based on a luminance specifying image taken by the camera that takes the posture specifying image, the luminance specifying image including an image of the light-emitting unit; and
    a drive current control unit that controls the drive current of the light-emitting unit based on the specified information indicating the luminance of the light-emitting unit.

2. The control apparatus according to claim 1, wherein the luminance information specifying unit specifies the information indicating the luminance of the light-emitting unit based on an area occupied by the light-emitting unit in the luminance specifying image including the image of the light-emitting unit.

3. The control apparatus according to claim 1, wherein the posture specifying image and the luminance specifying image are the same image.

4. The control apparatus according to claim 1, further comprising:
    a target value determination unit that determines a target value of the information indicating the luminance based on brightness of environment, wherein
    the drive current control unit controls the drive current of the light-emitting unit according to the target value of the information indicating the luminance.

5. The control apparatus according to claim 1, wherein, when the information indicating the luminance of the light-emitting unit cannot be specified, the luminance information specifying unit notifies that the information cannot be specified.

6. The control apparatus according to claim 5, wherein
    the head-mounted display includes a plurality of light-emitting units, and,
    when the information indicating the luminance of one of the plurality of light-emitting units cannot be specified, the luminance information specifying unit issues a notification according to the light-emitting unit for which the information indicating the luminance cannot be specified.

7. A head-mounted display including a light-emitting unit that emits light at luminance according to drive current, the head-mounted display comprising:
    a posture specifying unit that specifies a posture of the head-mounted display based on a posture specifying image taken by a camera, the posture specifying image including an image of the light-emitting unit;
    a luminance information specifying unit that specifies information indicating the luminance of the light-emitting unit based on a luminance specifying image taken by the camera that takes the posture specifying image, the luminance specifying image including an image of the light-emitting unit; and
    a drive current control unit that controls the drive current of the light-emitting unit based on the specified information indicating the luminance of the light-emitting unit.

8. A control method comprising:
    specifying a posture of a head-mounted display including a light-emitting unit that emits light at luminance according to drive current, the posture specified based on a posture specifying image taken by a camera, the posture specifying image including an image of the light-emitting unit;
    specifying information indicating the luminance of the light-emitting unit based on a luminance specifying image taken by the camera that takes the posture specifying image, the luminance specifying image including an image of the light-emitting unit; and controlling the drive current of the light-emitting unit based on the specified information indicating the luminance of the light-emitting unit.

\* \* \* \* \*